United States Patent
Bramlett et al.

[11] Patent Number: 5,813,352
[45] Date of Patent: Sep. 29, 1998

[54] VENTED HATCH COVER

[75] Inventors: Kevin D. Bramlett, Mars Hill; Michael W. DiLuigi, Asheville, both of N.C.

[73] Assignee: Trinity Industries, Inc., Dallas, Tex.

[21] Appl. No.: 740,185

[22] Filed: Oct. 28, 1996

Related U.S. Application Data

[60] Provisional application No. 60/007,174 Nov. 1, 1995.

[51] Int. Cl.$^6$ .................................................. B65D 51/00
[52] U.S. Cl. ...................................... 105/377.07; 220/372
[58] Field of Search ........................ 105/377.01, 377.05, 105/377.06, 377.07, 377.08; 220/1.5, 200, 202, 212, 213, 215, 254, 360, 366.1, 367.1, 368, 372, 913, DIG. 27, 373, 374, 371, 369

[56] References Cited

U.S. PATENT DOCUMENTS

| | | | |
|---|---|---|---|
| D. 340,207 | 10/1993 | Schultz | D12/43 |
| 2,603,308 | 7/1952 | McCall | 220/372 |
| 2,825,276 | 3/1958 | Porter | 220/372 |
| 4,127,216 | 11/1978 | Martin, Jr. et al. | 220/374 |
| 4,315,579 | 2/1982 | Martin | 220/371 |
| 4,609,126 | 9/1986 | Janda | 220/374 |
| 4,655,365 | 4/1987 | Miller | 220/314 |
| 4,690,070 | 9/1987 | Miller | 105/377 |
| 4,819,830 | 4/1989 | Schultz | 220/371 |
| 4,889,056 | 12/1989 | Stewart | 105/377 |
| 4,896,590 | 1/1990 | Groos | 98/6 |
| 4,902,173 | 2/1990 | Hendee et al. | 406/145 |
| 4,941,695 | 7/1990 | Miller | 292/256.5 |
| 5,011,038 | 4/1991 | Schultz | 220/320 |
| 5,035,185 | 7/1991 | Schultz | 105/424 |
| 5,064,089 | 11/1991 | Schultz | 220/372 |
| 5,095,824 | 3/1992 | Schultz | 105/247 |
| 5,239,772 | 8/1993 | Burian et al. | 43/131 |
| 5,353,949 | 10/1994 | Seibert et al. | 220/372 |
| 5,433,559 | 7/1995 | Vande Sande | 406/145 |
| 5,622,117 | 4/1997 | Bruian et al. | 105/377.7 |

*Primary Examiner*—Mark Tuan Le
*Attorney, Agent, or Firm*—Baker & Botts, L.L.P.

[57] ABSTRACT

A cover for closing a hatch opening in a container such as an enclosed railroad hopper car is provided. The cover is sized to fit over a coaming extending from the hatch opening. An outer rim is formed on the cover and cooperates with the coaming to form an air passage which surrounds an exterior surface of the coaming when the cover is disposed thereon. The cover includes a filter assembly and a gasket which cooperate to provide a continuous vent or air communication path between the interior and the exterior of the container through the air passage. All communication of air between the exterior of the container and the interior of the container is directed through the filter assembly.

26 Claims, 4 Drawing Sheets

VENTED HATCH COVER

TECHNICAL FIELD OF THE INVENTION

This application claims the benefit of U.S. Provisional Application No. 60/007,174. The present invention pertains to a hatch cover and, more particularly, to a vented hatch cover adapted for use with railway hopper cars and other containers which may be unloaded with vacuum assistance.

BACKGROUND OF THE INVENTION

Various types of containers are used to store and/or ship dry, bulk material such as grain, plastic pellets and other powdered or granular products. For optimum loading and unloading, interior portions of railway cars are frequently divided into multiple funnel-shaped sections or hoppers. Hence, these cars are frequently referred to as "hopper cars." During the past several years, many systems have been developed for improved loading and discharge of dry, bulk material from railway hopper cars.

Any dry powder, granular or pellet-shaped commodity, may be satisfactorily transported in a modern railway hopper car. Considering the large carrying capacity of a modern hopper car, it has become increasingly important to be able to rapidly discharge the contents of the hopper car. Therefore, enclosed railway hopper cars with pneumatic unloading systems are well known and frequently used for transportation of dry, bulk materials. The types of dry, bulk material carried in such hopper cars have increased significantly and include a wide range of new products which will flow through a pneumatic discharge system.

For some applications, enclosed railway hopper cars are provided with a positive pressure, pneumatic system for use in unloading dry, bulk material. Flour, starch, and similar food products are examples of such dry, bulk material which is often suitable for loading, transportation and discharge from an enclosed hopper car having a positive pressure pneumatic unloading system. U.S. Pat. No. 5,433,559 shows an example of one such railway hopper car.

Other types of enclosed railway hopper cars may be unloaded using gravity flow and/or vacuum assisted conveying lines to increase the rate of discharging material from the hopper car. Grain and plastic pellets are examples of dry, bulk material, suitable for loading, transportation and discharge from an enclosed hopper car having gravity and/or vacuum assisted conveying line.

Railway hopper cars carrying dry, bulk material are often unloaded by attaching a vacuum assisted conveying line to an outlet gate positioned at the bottom of each hopper section. The primary air flow for the vacuum conveying line is typically obtained from a source exterior to the respective hopper car. To increase material flow from the respective hopper car and to prevent any undesirable difference in pressure between the interior and the exterior of the respective hopper section, a vent path is preferably provided during unloading of the bulk material. Failure to provide a satisfactory vent for each hopper section will reduce the efficiency of the vacuum conveying line and may result in damage from an excessive difference in pressure between the interior and exterior of the respective hopper section. For some applications, venting during the unloading process is achieved by opening one or more hatch covers located on top of each hopper section.

Opening a hatch cover presents several disadvantages including a requirement for personnel having access to the top of the hopper car which may be difficult depending upon weather, the type of unloading facility and other environmental factors. Also, opening a hatch cover may present security and/or quality control problems with respect to the contents of the hopper car.

Contamination is often accelerated when a vacuum is drawn at the unloading facility, thereby pulling air from the atmosphere into the hopper car through the respective vent opening. Dirt and other contaminants may enter the hopper car and mix with the bulk material. In order to reduce such contamination, various types of filters have been provided at the associated vent opening. Examples of such filtration systems are shown in U.S. Pat. Nos. 4,819,830; 4,896,590; and 4,902,173. The above-referenced patents are incorporated by reference for all purposes within this application.

SUMMARY OF THE INVENTION

In accordance with the present invention, disadvantages and problems associated with previous hatch covers for containers used to store and/or ship dry, bulk materials have been substantially reduced or eliminated. The present invention provides an improved cover for a hatch opening in a railway hopper car, tank enclosure or other types of bulk material storage and/or transportation containers.

In accordance with one aspect of the present invention, a hatch cover is provided with a filter assembly and a gasket which are disposed within the interior of the hatch cover and which provide both security for the contents of the associated container and a vent path to assist with unloading of the bulk material. The filter assembly includes a filter having a generally disc-shaped configuration. The filter assembly also includes a filter retainer which may have an annular configuration. The gasket may also have an annular configuration.

The hatch cover cooperates with a hatch connected to the container to provide a ventilation air flow path to allow optimum performance of an associated discharge system without creating an undesirable difference in pressure between interior and exterior portions of the respective container. The filter assembly and gasket cooperate with each other to prevent undesired buildup of pressure within the respective container when the hatch cover is closed.

The hatch cover, filter assembly and gasket may be configured to allow ventilation air to enter the hatch from essentially all points about the perimeter of the hatch. According to one aspect, the hatch cover cooperates with a generally cylindrical hatch and ventilation air flow enters the hatch from the exterior in a 360-degree fashion.

Technical advantages of the present invention include providing a vented hatch cover which may be used with existing railway hopper cars without requiring modification to the respective hatch openings of the hopper cars. The vented hatch cover provides a relatively low profile which is compatible with the operating envelope of the associated railway hopper car and provides optimum aerodynamic performance. The vented hatch cover also provides a continuous air flow path to assist with discharging the contents of the respective railway hopper car without requiring personnel to open either the hatch cover or a separate ventilation air flow path. The continuously open air flow path provided by the vented hatch cover prevents any undesired build-up of pressure within the railway hopper car and substantially eliminates any possibility that the respective hatch cover will be opened under pressure.

In accordance with another aspect of the present invention, a filter assembly and a gasket are mounted on and secured to the interior of a vented hatch cover to provide a continuously open air flow path between the interior and the exterior of an associated container through the respective hatch opening. The filter assembly may be easily replaced and/or repaired. Depending upon the type of bulk material, a second filter assembly with increased filtration capability may be added as required to protect specific types of bulk material. A vented hatch cover incorporating the teachings of the present invention is particularly useful at vacuum-assisted unloading facilities which do not allow personnel access to the top of a railway hopper car. The present invention significantly reduces the total time required to unload a railway hopper car using a vacuum-assisted unloading system or a gravity unloading system.

Further technical advantages of the present invention include providing a vented hatch cover having a filter assembly and a gasket which cooperate with each other to provide a continuous air flow path when the hatch cover is in its closed position to minimize the possibility of unwanted violent opening of the hatch cover upon release of an associated latch mechanism by eliminating any pressure buildup inside the railway hopper car. The gasket minimizes the possibility of damaging the vented hatch cover and/or filter assembly during closing of the respective hatch cover. The gasket also accommodates any nicks, gouges and similar defects in an associated hatch coaming to ensure that all air flow between the interior and the exterior of the respective railway hopper car is directed through the filter assembly.

Other aspects, features and technical advantages will be readily apparent to those having ordinary skill in the pertinent art from a reading of the detailed description of the preferred embodiments in connection with the appropriate figures.

BRIEF DESCRIPTION OF THE DRAWINGS

For a more complete understanding of the present invention, and the advantages thereof, reference is now made to the following written description taken in conjunction with the accompanying drawings, in which.

DETAILED DESCRIPTION OF THE PREFERRED EMBODIMENTS

The preferred embodiments of the present invention and its advantages are best understood by referring to FIGS. 1 through 6 of the drawings, like numerals being used for like and corresponding parts of the various drawings.

Enclosed railway hopper cars are designed to transport dry, bulk materials such as grain, plastic pellets, flour, sugar, and other granular or powdered products. A car may have several hoppers to hold these individual materials. Outlets at the bottom of each hopper allow the materials to exit. The vented hatch cover of the present invention provides, among other things, an air flow which assists the exit of materials from the hopper.

Vented hatch cover 26 incorporating one embodiment of the present invention is shown in FIGS. 1–6. For purposes of illustration, vented hatch cover 26 will be described with respect to enclosed railway hopper car 10. However, a hatch cover incorporating the teachings of the present invention may be used with a wide variety of storage containers and/or shipping containers in addition to enclosed railway hopper cars. Also, vented hatch cover 26 is shown with a generally circular configuration. However, a hatch cover incorporating the teachings of the present invention may have a square, rectangular, or any other geometric configuration as required for the associated hatch opening and hatch coaming.

Figure 1:
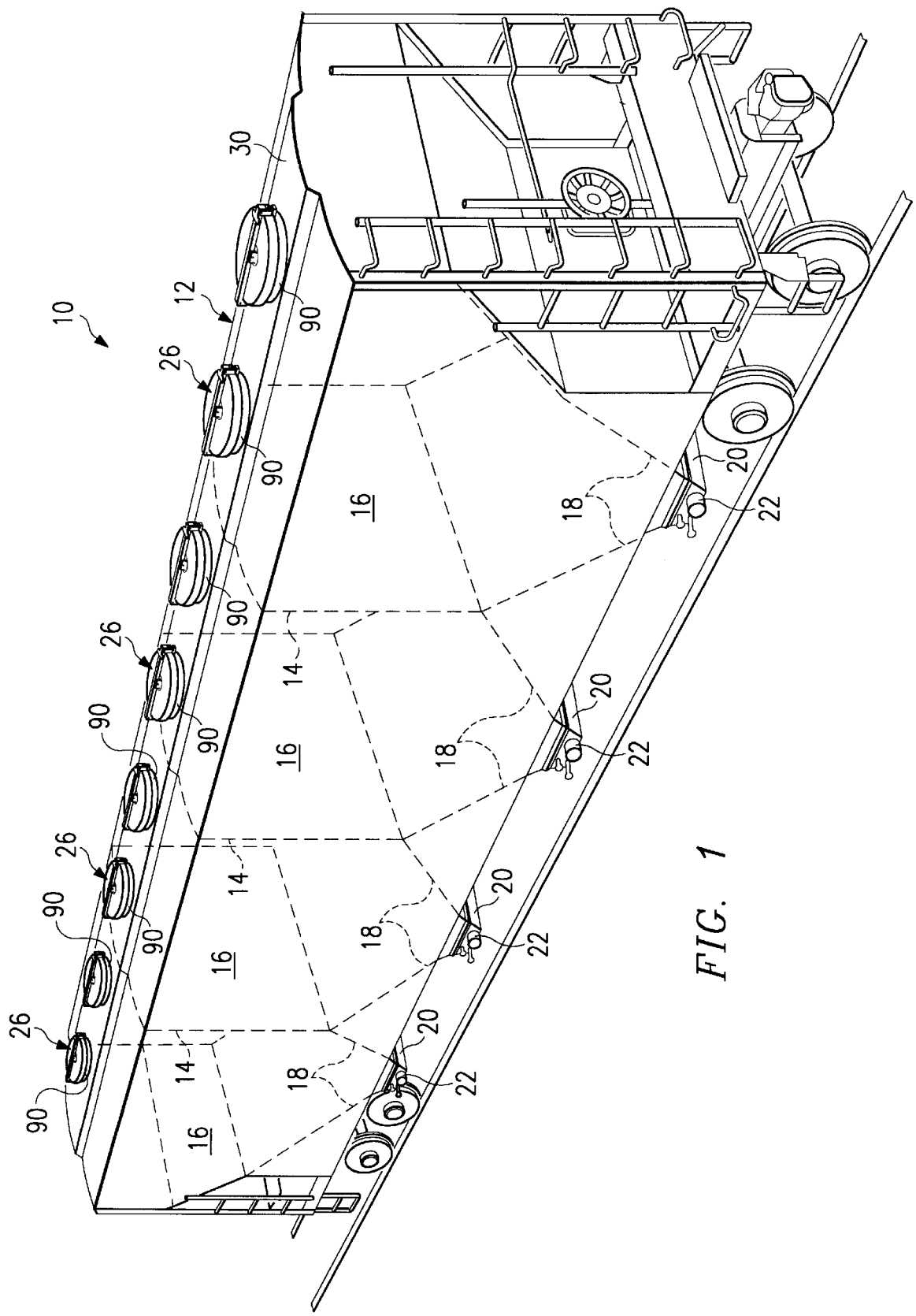
FIG. 1 is a perspective view of a rail car employing vented hatch covers in accordance with one embodiment of the present invention.

As shown in FIG. 1, a hopper car 10 has a plurality of hoppers 16. Each hopper has at least one hopper outlet 20. Preferably, each hopper outlet 20 is positioned at a bottom end portion of the hopper 16. More than one hopper outlet may be employed. Each hopper outlet 20 may have an associated vacuum duct 22 to which a vacuum conveying line (not shown) may be connected for providing vacuum-assisted removal of the material within the hopper 16.

Preferably, the interior of each hopper is defined by substantially vertical upper sidewall portions and sloped lower sidewall portions. For example, the hoppers 16 shown in FIG. 1 each have an interior defined by four sidewalls. Each sidewall has a substantially vertical upper sidewall portion 14 and a sloped lower sidewall portion 18. Preferably, sloped sidewall portions 18 each slope inwardly from respective lower edges of vertical sidewall portions 14 to respective upper edges of hopper outlet 20.

The configuration of the interior of each hopper is preferably designed to assist in the exit of material from the hopper. It should be noted that configurations other than that shown in FIG. 1 may be used to accomplish this objective. For instance greater or fewer than four sidewalls may be used. Also, the interior perimeter of hopper 16 and of first outlet portion 20 may comprise shapes other than a square as shown. For example, the interior may be funnel-shaped.

FIG. 1 also shows roof 30 of hopper car 10. Roof 30 includes at least one hatch 90. Each hopper 16 has at least one associated hatch 90 which is preferably located at an upper end thereof in roof 30. Each hopper 16 may have more than one hatch 90. Hatch 90 is shown in greater detail in FIG. 3. Hatch 90 comprises a hatch opening 91, which is preferably formed in roof 30 above a particular hopper 16. Preferably, hatch opening 91 has a generally circular shape, but the hatch opening may have other shapes.

Figure 3:
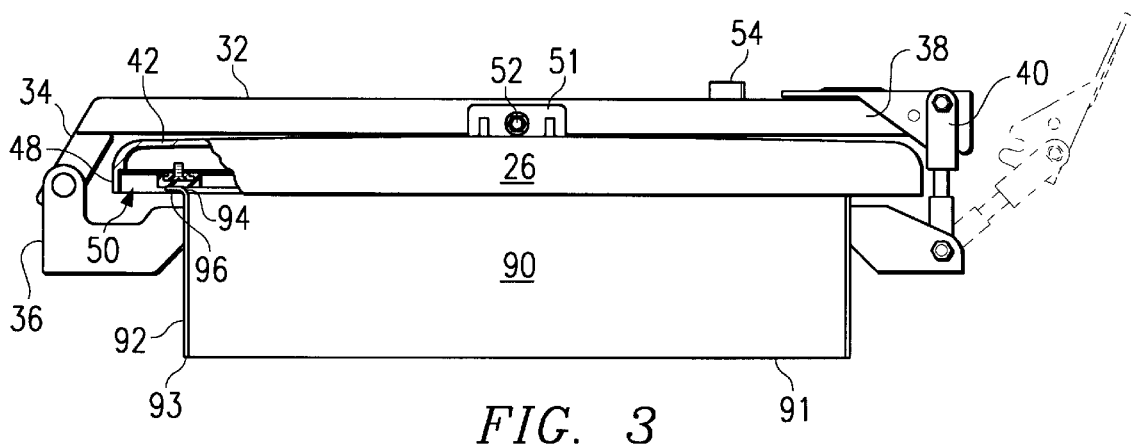
FIG. 3 is an elevation of the vented hatch cover of FIGS. 1 and 2 and having a cutaway portion.

The hatch 90 also comprises a coaming 92 having a proximal end 93 adjacent the roof 30 and a distal end 94 spaced apart from roof 30. Hatch coaming 92 terminates in a coaming rim 96 at distal end 94. Coaming 92 should have a cross section which generally matches the shape of hatch opening 91. Thus, as shown in FIGS. 1 and 3, coaming 92 is cylindrical and has a circular cross section. However, it should be noted that other shapes and configurations may be used.

Preferably, coaming 92 is connected to roof 30 by peripheral weld or other suitable technique. Thus, the roof and associated coamings form an integral structure.

Dry, bulk material is generally loaded from a bulk loading facility (not shown) through the hatches into the respective hopper car. The hatches are then closed and the hopper car transported to its desired unloading destination. At the unloading facility (not shown), a vacuum-assisted conveying line (not shown) may be attached to one or more of the hopper outlets. The dry, bulk material is then unloaded by applying a vacuum to the hopper car from the hopper outlet. During both shipment and unloading, it is very important to protect the dry, bulk material contained within the hopper car from contamination by external sources.

To protect the contents of the respective hopper car, the hatches and outlets are generally provided with covers. Each hatch 90 preferably has a vented hatch cover 26 associated therewith. For some applications railway hopper car 10 may have four hoppers 16 (as shown in FIG. 1) with either two or three hatches 90 per hopper 16 formed in roof 30 for use in loading the respective hopper section. FIG. 1 shows two hatches 90 for each hopper 16. For some applications, fewer than all of the hatch covers for a given hopper 16 are vented. For example, as shown in FIG. 1, a configuration is provided in which only one of the hatch covers for a given hopper 16 is a vented hatch cover 26. The other hatch covers may be conventional non-vented hatch covers. For other applications, each hatch 90 of a particular hopper 16 will have a vented hatch cover 26 to increase the amount of air flow into the respective hopper section during vacuum unloading and thus increase the rate of discharging dry, bulk material therefrom.

Figure 2:
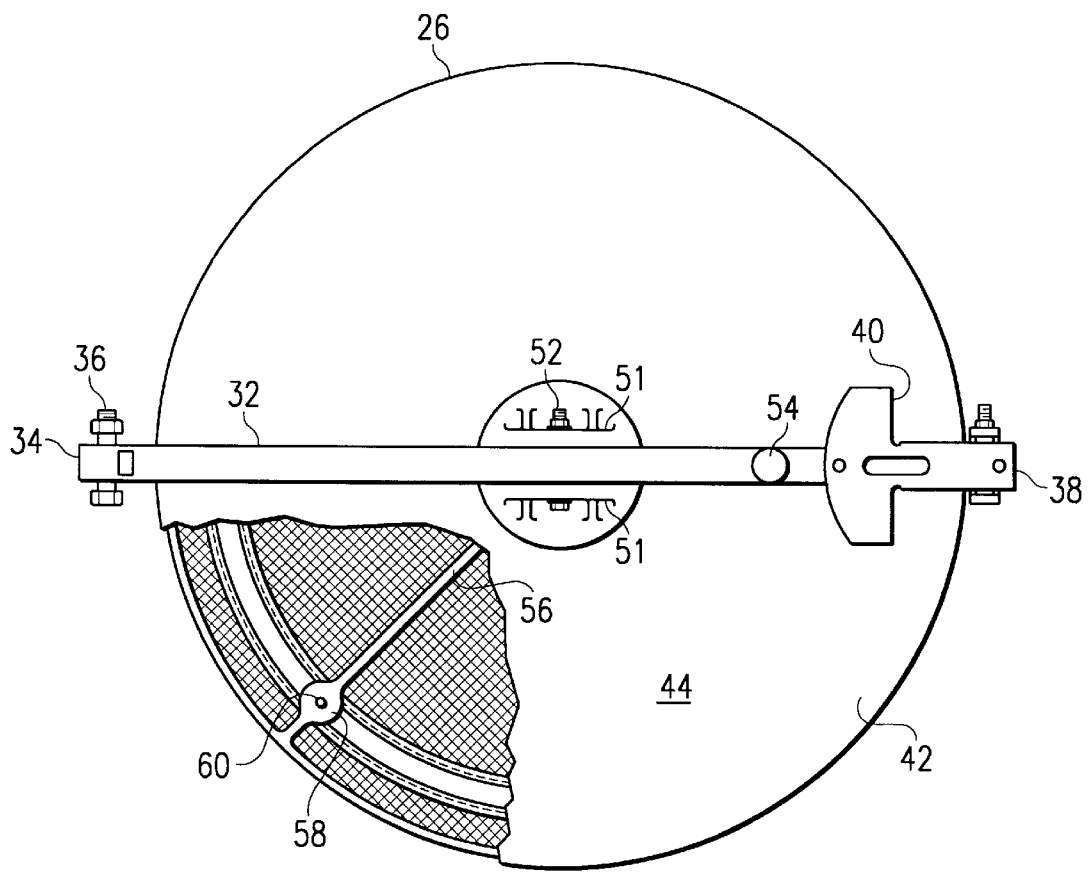
FIG. 2 is plan view of one of the vented hatch covers of FIG. 1 with a cutaway portion.

FIGS. 2–6 show a vented hatch cover 26 in greater detail. As shown in FIGS. 1, 2 and 3, vented hatch cover 26 is preferably connected to an elongated hold down and support bar 32 which extends diametrically across vented hatch cover 26. A first end 34 of hold down bar 32 may be pivotally attached to hinge assembly 36 to allow rotation of vented hatch cover 26 between a first, closed position and a second, open position. A second end 38 of hold down bar 32 includes latching mechanism 40 which is used to releasably secure vented hatch cover 26 in the first, closed position.

Various types of hold down bars and latching mechanisms may be satisfactorily used with a vented hatch cover incorporating the teachings of the present invention. For example, U.S. Pat. No. 4,889,056 entitled *Cover and Latching Mechanism for Railcar Loading Hatch* discloses a hold down bar and latching mechanism satisfactory for use with the present invention. U.S. Pat. Nos. 4,655,367 entitled *Hatch Cover Lock,* 4,690,070 entitled *Hatch Cover Structure,* and 4,941,695 entitled *Hatch Cover Assembly,* show other types of hold down bars and latch mechanisms which may be used with the present invention. Each of the preceding patents is incorporated by reference for all purposes within this application.

Vented hatch cover 26 includes a generally circular plate member 42 having an outer surface 44 and an inner surface 46. An outer rim 48 is preferably formed as an integral part of circular plate member 42 to extend from a periphery of plate 42 to a terminal end 49 spaced apart from plate member 42. Outer rim 48 cooperates with plate 42 to form a cup-shaped member. Preferably, rim 48 is substantially perpendicular to plate 48. Also, when the vented hatch cover 26 is in the first, closed position, terminal end 49 should be located longitudinally between proximal end 93 and distal end 94 of coaming 92. This configuration provides an air plenum 50 between the rim 48 and the coaming 92. Air plenum 50 thus surrounds an entire exterior surface of coaming 92 and an outer peripheral edge 89 of a gasket 82 (FIGS. 4 and 6), such that air may pass through the air plenum 50 to move between the interior and exterior of the container. Air may thereby move into and out of the hopper 16 by passing substantially all points about a periphery of coaming rim 96.

As will be discussed later in more detail, outer rim 48 is sized to fit over hatch coaming 92 with outer rim 48 extending radially from exterior surface of hatch coaming 92 when vented hatch cover 26 is in its first, closed position. As stated above, other shapes of hatches, coamings and covers may be used in connection with the present invention. Therefore, even though a circular plate member having an annular rim is shown in the figures, these and other elements may have other shapes.

As shown in FIGS. 2 and 3, vented hatch cover 26 preferably includes a pair of brackets 51 generally located proximate the center of circular plate member 42 and extending outwardly from outer surface 44. Brackets 51 are spaced radially from each other to receive hold down and support bar 32 therebetween. Connecting pin 52 extends between brackets 51 and is used to attach hold down and support bar 32 to vented hatch cover 26. Connecting pin 52 and brackets 51 cooperate with each other to form a relatively loose pivotal connection between vented hatch cover 26 and hold down and support bar 32. This allows, among other things, equalizing closing forces applied to vented hatch cover 26 by hold down and support bar 32. As will be explained later in more detail, equalizing such closing forces assists in forming a more uniform fluid tight seal between gasket 82 (FIG. 4) and rim 96 of hatch coaming 92.

For some applications, hold down and support bar 32, hinge assembly 36 and latching mechanism 40 may be formed from stainless steel or other suitable metal alloys. For other applications, hold down and support bar 32, hinge assembly 36 and latching mechanism 40 may be formed from high strength composite materials such as fiber-reinforced plastic. An elastomeric bumper 54 may be secured to hold down and support bar 32 for engagement with roof 30 of railway hopper car 10 when vented hatch cover 26 is in its second, open position to prevent excessive impact between hold down and support bar 32 and roof 30.

As best shown in FIG. 2 and 3, vented hatch cover 26 has a generally smooth outer surface 44. For some applications, vented hatch cover 26 is preferably formed from high strength plastic material using injection molding techniques. Alternatively, vented hatch cover 26 may be formed from aluminum, stainless steel, other metal alloys, composite materials or fiber reinforced plastic depending upon the intended application for the resulting vented hatch cover 26.

Figure 5:
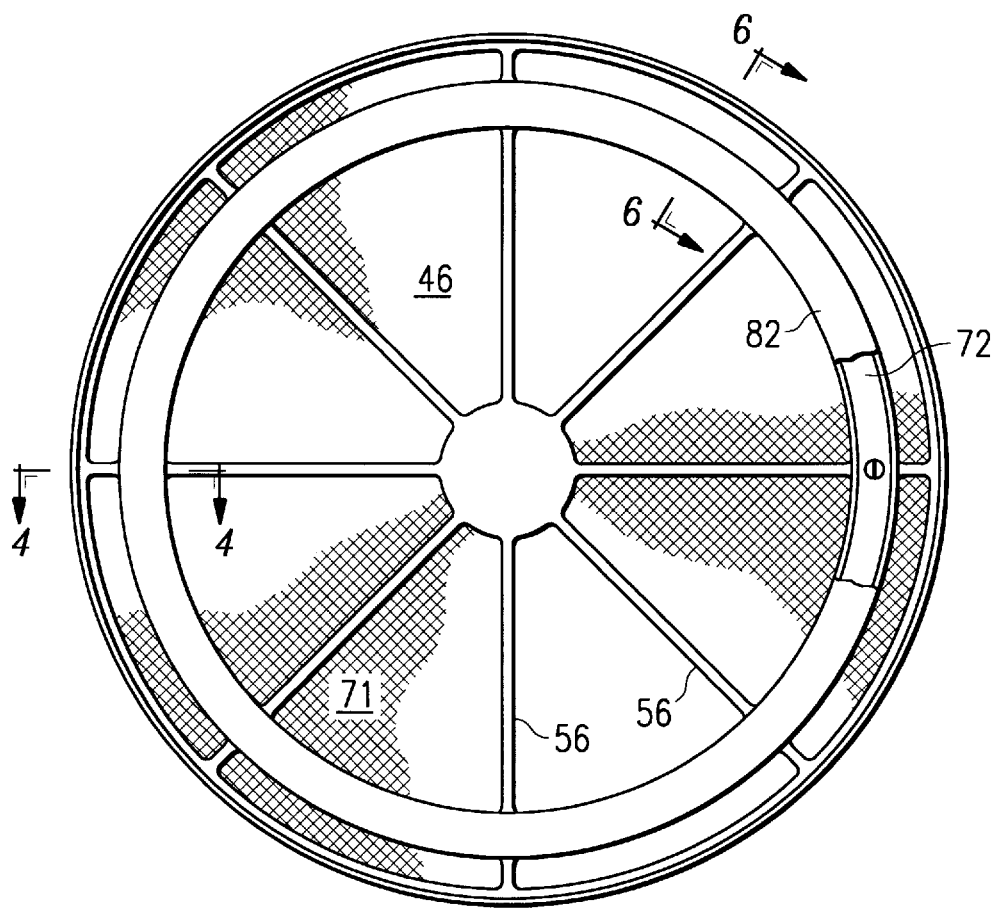
FIG. 5 is a plan view of portions of the vented hatch cover of FIG. 2.

As shown in FIGS. 2 and 5, inner surface 46 of vented hatch cover 26 preferably includes a plurality of first reinforcing ribs 56 protruding from inner surface 46 and radially extending from a perimeter region of plate member 42 to a central region of plate member 42. Preferably, the plurality of first reinforcing ribs 56 comprises eight ribs, which divide the hatch opening 91 into eight wedge-shaped regions. Preferably, first reinforcing ribs 56 are spaced angularly at approximately forty five degree (45°) intervals relative to each other.

Figure 5A:
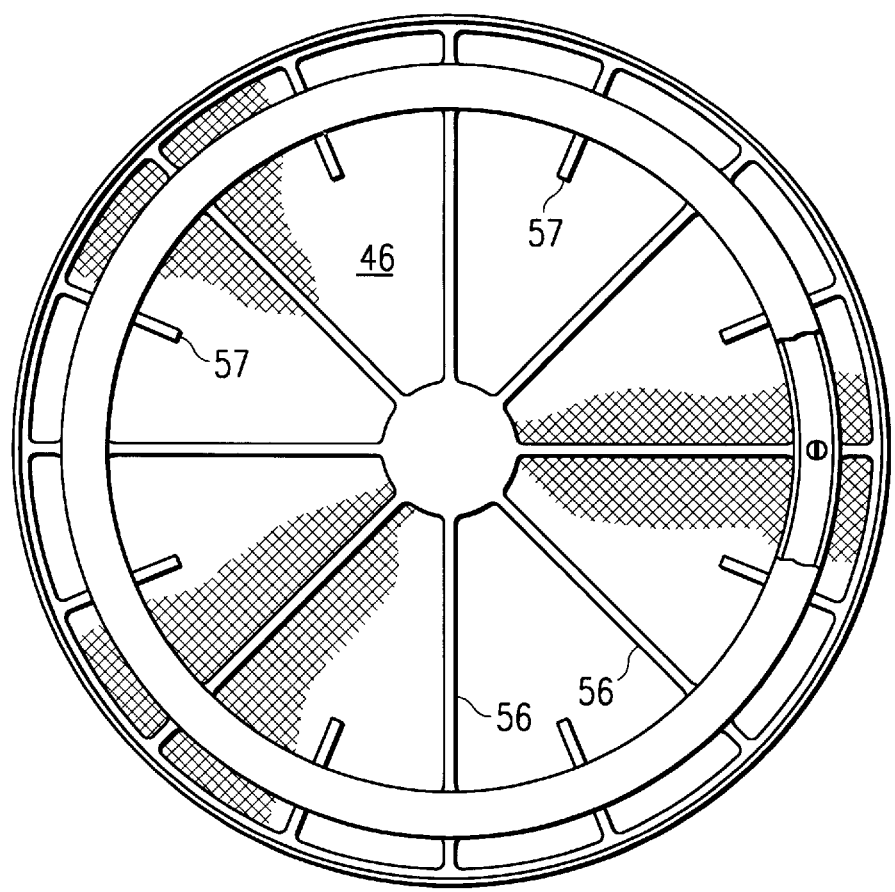
FIG. 5A is a plan view of portions of a vented hatch cover in accordance with optional features of the hatch cover of FIG. 5.

As shown in FIG. 5A, a plurality of second reinforcing ribs 57 may be provided to protrude from inner surface 46. Second reinforcing ribs radially extend from the perimeter region of the plate member 42 toward the central region of the plate member 42. However, the second reinforcing ribs 57 stop short of the central region. Thus, the first reinforcing ribs are radially longer than the second reinforcing ribs.

Figure 6:
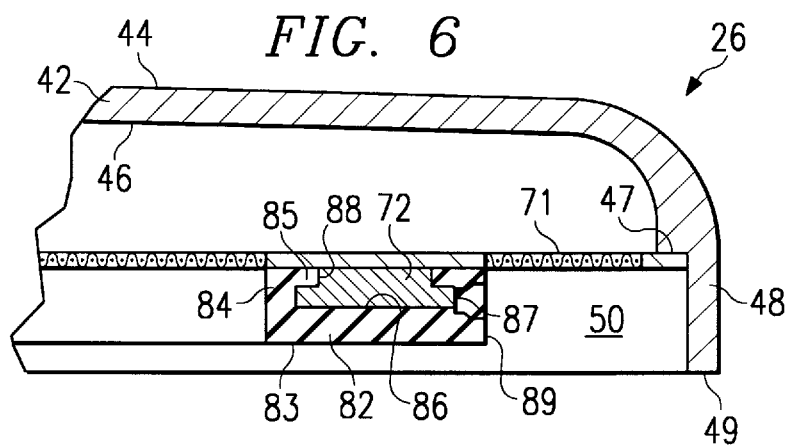
FIG. 6 is an enlarged sectional view of a vented hatch cover taken along line 6—6 of FIG. 5.

With further reference to FIG. 6, a filter assembly and a gasket 82 are disposed within the interior of vented hatch cover 26. The filter assembly includes filter 71 and filter retainer 72. Filter 71 is preferably formed to be generally planar and disc-shaped.

Figure 4:
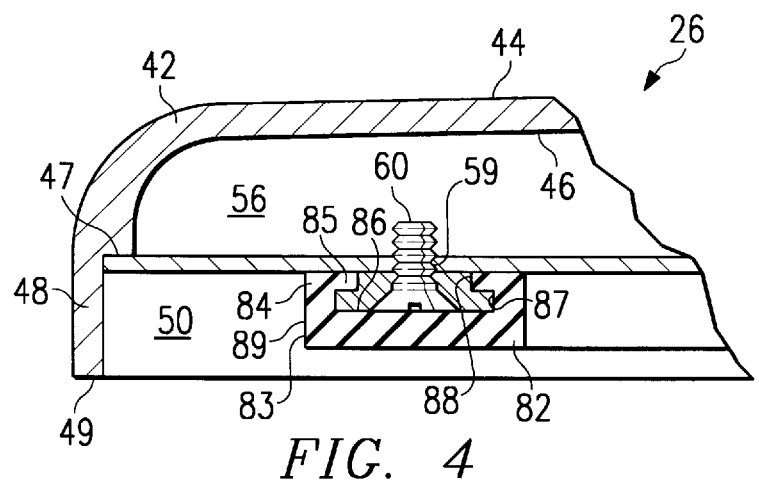
FIG. 4 is an enlarged sectional view of a vented hatch cover taken along line 4—4 of FIG. 5.

As best seen in FIGS. 2 and 4, each of the plurality of first reinforcing ribs 56 is provided with a mounting portion 58. Mounting portion 58 may be thicker than the remainder of rib 56 and is provided with a threaded hole 59 for receiving a matching screw 60.

Filter retainer 72 is generally annular in shape. A radial width of filter retainer 72 has a circular centerline which is concentric with the center of vented hatch cover 26. A plurality of holes is provide along the circular centerline of the filter retainer 72 such that these holes are aligned with threaded holes 59 when the filter assembly 70 is mounted.

To mount filter assembly 70, filter 71 is placed within the interior of vented hatch cover 26 such that a peripheral edge of filter 71 abuts and rests against a flange portion 47 integrally formed in an interior side surface of outer rim 48. Preferably, filter 71 also rests against each of the plurality of first and second reinforcing ribs 56 and 57. Filter retainer 72 is then positioned against filter 71 such that at least a portion of filter 71 is disposed between filter retainer 72 and plate member 42. Screws 60 are then inserted through the holes in filter retainer 72 and screwed into threaded holes 59 to secure filter retainer 72 and filter 71 to the interior of vented hatch cover 26.

A gasket 82 is provided and is disposed within the interior of vented hatch cover 26. Preferably, gasket 82 is generally annular in shape. Gasket 82 generally cooperates with filter 71 and filter retainer 72 to provide a fluid tight seal between these elements when vented hatch cover 26 is in its first, closed position.

Gasket 82 preferably comprises a seal portion 83, a wall portion 84 and a lip portion 85. Seal portion 83, wall portion 84 and lip portion 85 cooperate to form a channel 86 having an interior portion 87 and an opening portion 88. Gasket 82 has an outer peripheral edge 89. Preferably, filter retainer 72 is at least partially surrounded by gasket 82 by being positioned within channel 86. Thus, filter retainer 72 is generally disposed between seal portion 83 and filter 71. Lip portion 85 is generally disposed between filter 71 and filter retainer 72. Seal portion 83 abuts coaming rim 96 of coaming 92 to form a fluid tight seal therewith when vented hatch cover 26 is in the first, closed position.

For some applications, gasket 82 is formed from elastomeric material and is designed to snugly fit over filter retainer 72 as described. For other applications, gasket 82 may be formed from other suitable gasket materials and may be adhesively bonded to filter retainer 72.

Hatch coaming 92 preferably has a generally hollow cylindrical configuration with an outside diameter selected to be compatible with the diameter of hatch opening 91. Coaming rim 96 is preferably formed on the distal end 94 of hatch coaming 92. The dimensions of the filter assembly and gasket 82 are preferably selected such that these elements cooperate to form a a fluid tight barrier when vented hatch cover 26 is in its first, closed position.

Gasket 82 performs several important functions to ensure long term satisfactory performance of the associated vented hatch cover 26. Gasket 82 is preferably formed from relatively thick elastomeric material to absorb impact forces during closing of the associated vented hatch cover 26. The presence of gasket 82 is particularly important for those applications in which plate member 42 has been formed from plastic material using injection molding techniques. Without the presence of gasket 82, slamming vented hatch cover 26 onto hatch coaming 92 would possibly crack or shatter circular plate member 42 when formed from hard plastic material.

Gasket 82 also forms a fluid tight barrier with rim 96 of coaming 92 to ensure that any air flow between the exterior of enclosed railway hopper car 10 and hatch opening 91 will only occur through the filter assembly. Thus, gasket 82 and the filter assembly cooperate with each other to substantially reduce any possibility of contamination to the bulk, dry material contained within the associated hopper 16. By forming gasket 82 from relatively thick elastomeric material, gasket 82 can compensate for any nicks, scratches or similar deformities which may occur in rim 96 of the respective hatch coaming 92.

As described above, outer rim 48 cooperates with the exterior surface of hatch coaming 92 and with the outer peripheral edge 89 of gasket 82 to define air plenum 50. Air plenum 50 has a generally annular configuration extending around the inside perimeter of vented hatch cover 26. Outer surface 44 and the exterior surface of outer rim 48 cooperate with each other to protect filter assembly 70 from rain or melted snow while still providing air plenum 50 with a cross-sectional area sufficient for relatively unrestricted air flow. The size of air plenum 50 is determined by the distance between the outer peripheral edge 89 of gasket 82 and the inner surface of outer rim 48.

The described configuration permits air to travel into and out of the hatch 90 in a 360-degree fashion, while still requiring the air to pass through filter 71. For instance, under vacuum removal conditions, air may enter air plenum 50 from around the entire periphery of the hatch coaming 92. Air passes through filter 71, around filter retainer 72 and gasket 82, back through filter 71, into the interior of hatch coaming 92, and into hopper 16 through hatch opening 91.

Locating the filter assembly and gasket 82 within the interior of vented hatch cover 26, in accordance with the teachings of the present invention, results in vented hatch cover 26 having a relatively smooth, uniform exterior surface 44 to minimize wind resistance and improve the overall aerodynamic characteristics of roof 30. The location of the filter assembly and gasket 82 also allows vented hatch cover 26 to have a relatively low profile that is compatible with the operating envelope for the associated enclosed railway hopper car 10.

Preferably, the air communication flowpath defined in part by air plenum 50 and the filter assembly is continuously open between the respective hatch opening 91 and the exterior of the associated enclosed railway hopper car 10 when vented hatch cover 26 is in its first, closed position. Therefore, the possibility of any pressure buildup within the respective hopper section is substantially eliminated. Also, since the air communication flowpath is continuously open, there is no need for personnel to have access to the top of the associated railway hopper car 10 during unloading of the dry, bulk material contained therein.

For some applications, filter 71 may be formed from a relatively thin strip of woven plastic mesh with the desired disc-shaped configuration. For other applications, filter 71 may be formed from spiral wound stainless steel having a substantially more rigid construction as compared to woven plastic mesh. Depending upon the type of material used to form circular plate member 42 and filter retainer 72, various configurations other than the above-described screws and threaded holes may be satisfactorily used to install filter 71 on the interior of each vented hatch cover 26.

For some applications, a second filter assembly (not shown) may be disposed between gasket 82 and the inner surface of plate 42. Such additional filter assemblies may be required depending upon the type of dry, bulk material contained within the respective railway hopper car.

The preferred embodiments thus described have been provided by way of example only. Those having ordinary skill in the pertinent art will appreciate that various substitutions and modifications may be made to these embodiments without departing from the scope and spirit of the invention as recited in the appended claims.

What is claimed is:

1. A cover for a hatch opening in a container, the hatch opening defined in part by a hatch coaming extending therefrom, the cover comprising:
   a plate member having an outer rim extending from a perimeter of the plate member, the plate member and outer rim defining an interior of the cover; and
   a filter assembly mounted on the interior of the cover,
   wherein the filter assembly comprises a generally planar filter and is positioned to permit air flow into and out of the cover and the hatch coaming and about entire perimeters of the cover and the hatch coaming.

2. The cover of claim 1 wherein the plate member is disc-shaped.

3. The cover of claim 1, the cover movable between a closed position and an open position, the cover further comprising a gasket having a first side surface in contact with the filter and a second side surface engageable with the hatch coaming when the cover is in the closed position to form a fluid seal between the filter and the hatch coaming.

4. The cover of claim 3 wherein the gasket is annular-shaped.

5. The cover of claim 1 further comprising a gasket engageable with the filter and with the hatch coaming when the cover is in a closed position such that air passing between an exterior and an interior of the container must pass through the filter at least twice.

6. The cover of claim 1 wherein the filter is formed from plastic woven mesh.

7. The cover of claim 1 wherein the filter is formed from spiral wound stainless steel.

8. The cover of claim 1 wherein the plate member is formed from injection molded plastic.

9. The cover of claim 1, wherein the filter assembly further comprises a filter retainer attached to the plate member, the filter being disposed between the plate member and the filter retainer.

10. The cover of claim 9 wherein the filter retainer is annular-shaped.

11. The cover of claim 1, further comprising a plurality of reinforcing ribs extending from an inner surface of the plate member,
    the filter assembly further comprising a filter retainer attached to at least one of the reinforcing ribs, the filter being disposed between the filter retainer and the inner surface of the plate member.

12. The cover of claim 11 further comprising a gasket attached to the filter retainer and engageable with the hatch coaming when the cover is in a closed position.

13. The cover of claim 12 wherein the gasket at least partially surrounds the filter retainer.

14. The cover of claim 12 wherein the gasket is formed from an elastomeric material.

15. The cover of claim 1 further comprising:
    a plurality of first reinforcing ribs protruding from an inner surface of the plate member and extending from a perimeter region of the plate member to a central region of the plate member;
    a plurality of second reinforcing ribs protruding from the inner surface of the plate member and extending from a perimeter region of the plate member toward the central region of the plate member, the first reinforcing ribs being radially longer than the second reinforcing ribs; and
    a filter retainer attached to each of the plurality of first reinforcing ribs, the filter being disposed between the filter retainer and the inner surface of the plate member.

16. The cover of claim 1, further comprising at least one reinforcing rib protruding from an inner surface of the plate member and extending radially inward from a periphery of the plate member.

17. The cover of claim 1, further comprising at least one reinforcing rib protruding from an inner surface of the plate member and extending from a periphery of the plate member radially inward beyond a point corresponding to the hatch coaming when the cover is in a closed position.

18. The cover of claim 1, further comprising at least one reinforcing rib protruding from an inner surface of the plate member and extending from a periphery of the plate member radially inward to a central region of the plate member.

19. A railway hopper car comprising:
    a plurality of hopper sections;
    a roof covering at least one of the hopper sections;
    at least one hatch opening extending through the roof and providing communication between an interior and an exterior of the at least one hopper section, the at least one hatch opening defined in part by a hatch coaming extending from a portion of the roof; and
    a vented hatch cover disposed on the at least one hatch opening, the vented hatch cover comprising:
    a plate member having an outer rim extending from a perimeter of the plate member, the plate member and outer rim defining an interior of the vented hatch cover; and
    a filter assembly mounted on the interior of the vented hatch cover,
    wherein the filter assembly comprises a generally planar filter and is positioned to permit air flow and out of the cover and hatch coaming and about entire perimeters of the cover and the hatch coaming.

20. The railway hopper car of claim 19, wherein the vented hatch cover is movable between a first, closed position and a second open position, the vented hatch cover further comprising a gasket having a first side surface in contact with the filter and a second side surface engageable with the hatch coaming when the cover is in the first, closed position.

21. The railway hopper car of claim 19, wherein the filter assembly further comprises a filter retainer attached to the plate member, the filter being disposed between the plate member and the filter retainer.

22. The railway hopper car of claim 19 further comprising:
    a hinge assembly mounted on the roof of the hopper car adjacent to at least one hatch opening;
    a hold down and support bar rotatably attached to the hinge assembly, the plate member coupled with the hold down and support bar intermediate the ends thereof; and
    a latching mechanism disposed on the roof of the enclosed railway hopper car adjacent to the at least one hatch opening to releasably engage the hold down and support bar and thereby releasably secure the vented hatch cover in a closed position.

23. The cover of claim 22 further comprising a filter member connected to the plate member, wherein air flowing between an interior and exterior of the hatch coaming flows through the filter member.

24. A cover for covering an opening of a container, the cover adapted to be selectively opened and closed, the cover comprising:

a cup-shaped member; and a filter disposed within the cup-shaped member, wherein when the cover is closed, the filter covers the opening and extends beyond a periphery of the opening, and wherein when the cover is closed, air may flow freely between an interior and exterior of the container, and through the filter at substantially all points about the periphery of the opening.

25. The cover of claim 24, wherein the opening is partly defined by a coaming extending from the container, the cup-shaped member cooperating with the coaming to form an air plenum between the cover and the coaming, the air plenum surrounding an entire exterior surface of the coaming, wherein air may pass through the air plenum to move between the interior and exterior of the container.

26. A cover for a hatch opening in a container, the hatch opening defined in part by a hatch coaming extending from the hatch opening and having a distal end, the cover comprising:

a plate member having an inner surface and an outer rim extending from a perimeter of the plate member, the plate member being receivable over the hatch opening with a gap between the distal end of the hatch coaming and the inner surface of the plate member, and with the outer rim spaced outwardly from the hatch coaming to create an annular space between the hatch coaming and the rim, the annular space and the gap extending substantially about an entire perimeter of the hatch coaming such that air is permitted to flow through the annular space and the gap, and into and out of the cover and the hatch coaming and about substantially entire perimeters of the cover and the hatch coaming.

* * * * *